N. H. SOOY.
TRACTOR.
APPLICATION FILED APR. 10, 1917.
1,279,030.
Patented Sept. 17, 1918.
2 SHEETS—SHEET 1.
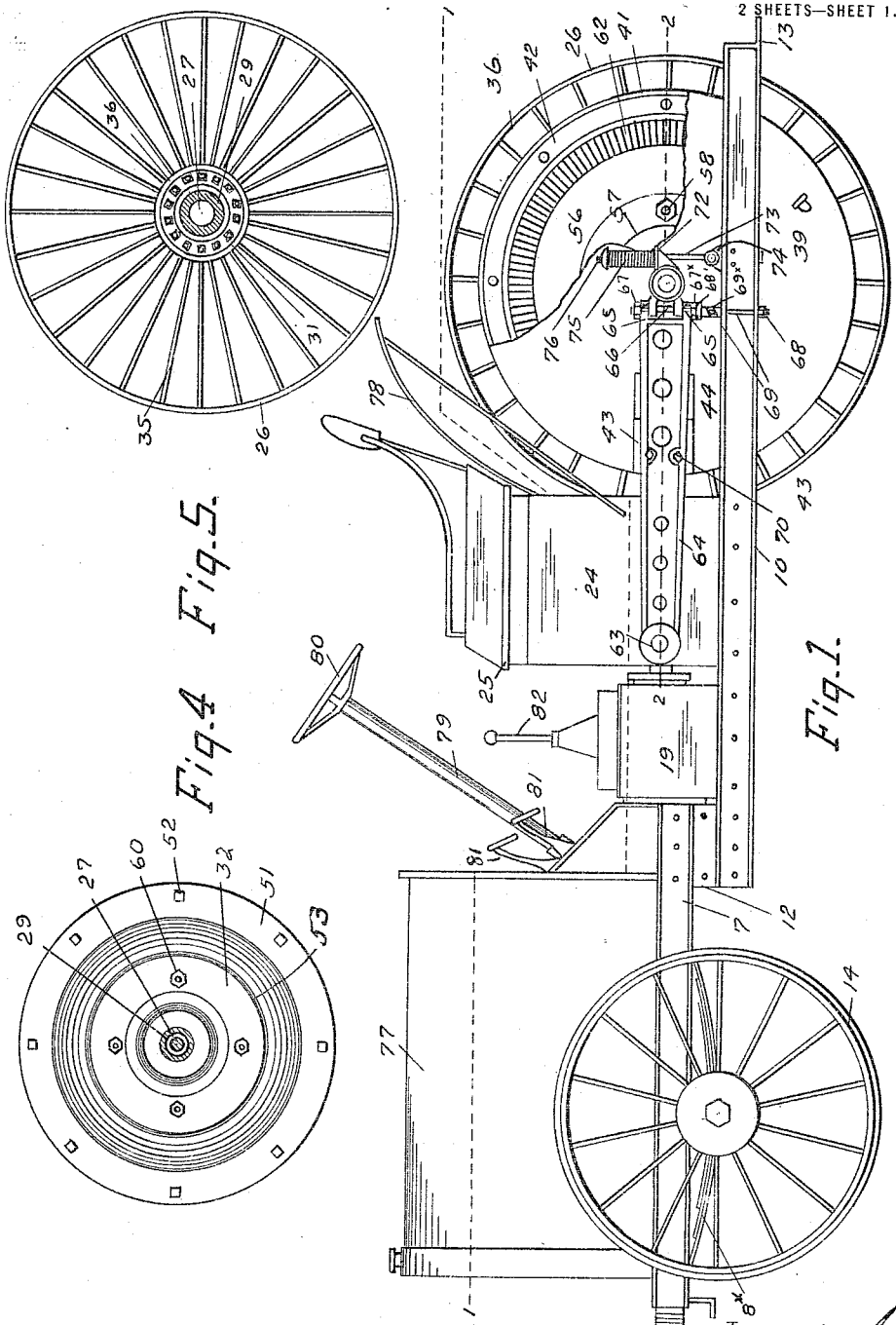

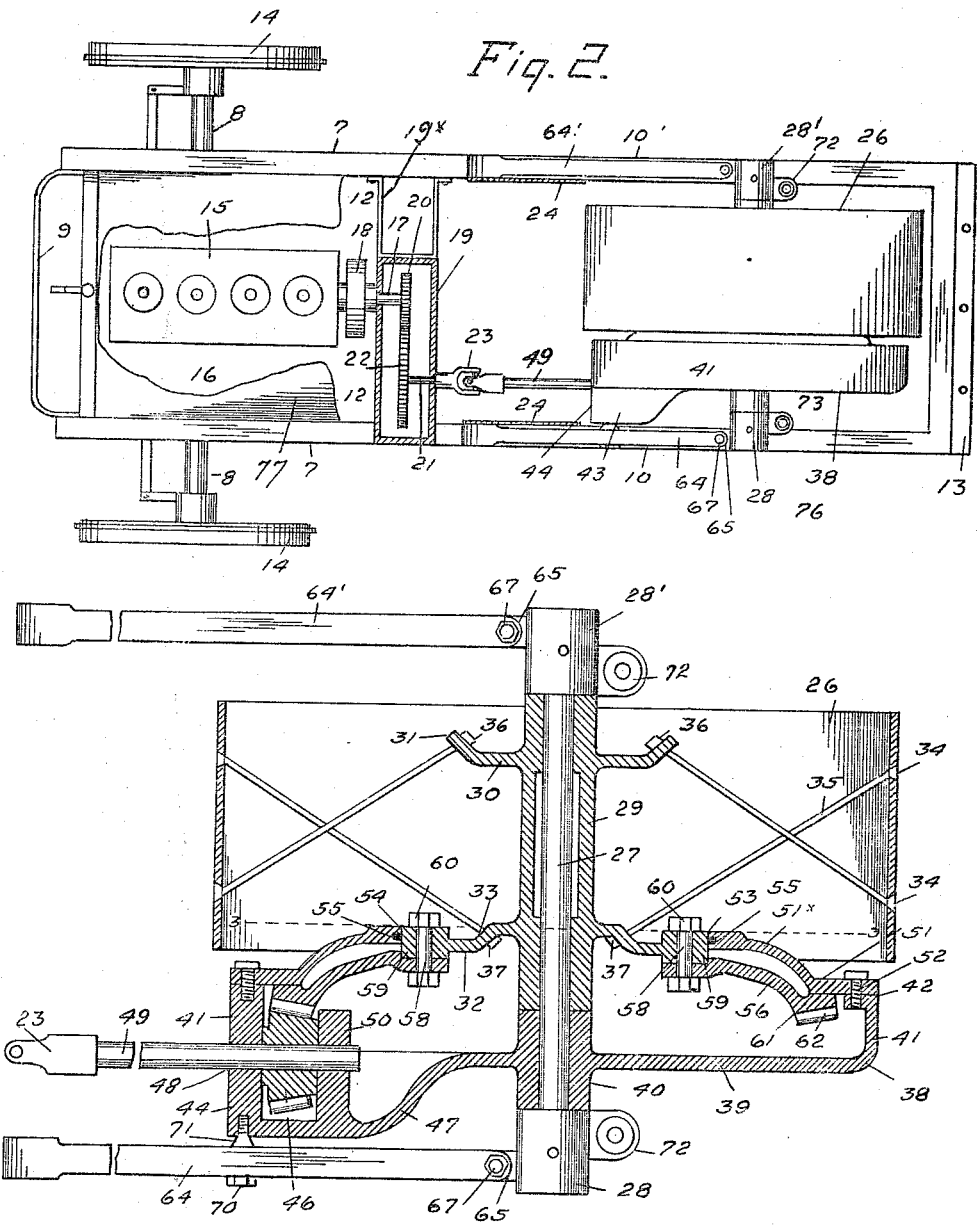

UNITED STATES PATENT OFFICE.

NORMAN H. SOOY, OF KANSAS CITY, MISSOURI, ASSIGNOR TO THE KANSAS CITY HAY PRESS COMPANY, OF KANSAS CITY, MISSOURI, A CORPORATION OF MISSOURI.

TRACTOR.

1,279,030.      Specification of Letters Patent.      Patented Sept. 17, 1918.

Application filed April 10, 1917. Serial No. 160,950.

*To all whom it may concern:*

Be it known that I, NORMAN H. SOOY, a citizen of the United States of America, residing at Kansas City, in the county of Jackson and State of Missouri, have invented certain new and useful Improvements in Tractors; and I do hereby declare that the following is a full, clear, and exact description of the invention, reference being had to the accompanying drawings, forming a part of this specification.

The invention relates to tractors particularly designed for land plowing and road construction, in the operation of which a low speed is usually maintained.

The invention has for its object:

First, to preserve the alinement of the power transmission shafts, while subject to the corresponding degree of vibration communicated to the motor and frame, when the tractor is moving over rough and uneven ground.

Second, in a suspension frame for motor vehicles, to provide an independent guiding support for the alinement of the transmission shafts and gear.

Third, to prevent intermission of the motive power transmitted to the traction wheels through the vibrations of the motor supporting frame.

The invention consists in the novel construction and combination of parts, such as will be first fully described, and then specifically pointed out in the claims.

In the drawings:

Figure 1. is a side view of the improved tractor, a portion of the outer casing adjacent the rear traction wheel being broken away to show the rotatable gear wheel.

Fig. 2. is a plan view of the tractor, taken on line, 1, 1, on Fig. 1.

Fig. 3. is an enlarged, detail, horizontal sectional view, taken upon line 2, 2, on Fig. 1.

Fig. 4. is a detail view of the inner member of the casing, taken from within the traction wheel, and from line 3, 3, on Fig. 3, looking in the direction of the outer member of the casing; also showing the concentric, rotatable disk on the hub of the traction wheel, carrying the gear wheel actuating the traction wheel, the wheel and casing supporting shaft being shown in section.

Fig. 5. is a view of the reverse side of the traction wheel to that seen in Fig. 1, showing the means for securing the spokes to the hub.

Similar numerals of reference indicate corresponding parts in all the figures of the drawing.

The frame of the tractor, as seen in the drawings, to which reference is now made, consists of the parallel channel beams 7, 7, at the forward end of the frame, which are supported by carriage springs $8^x$, the latter being connected with the beams 7, 7. The forward transverse axle 8 is connected with the springs of the carriage $8^x$, and as shown is one-third the distance rearwardly from the forward ends of beams 7, 7. With the forward ends of the beams 7, 7, are connected the respective ends of a guard rail or bar 9.

The rear portion of the frame of the tractor consists of the parallel channel beams 10, 10', which are approximately twice the length of the beams 7, 7, and extend in a horizontal line rearwardly and a short distance below a horizontal line extending upon the lower surface of the beams 7, 7. With the inner surface and forward ends of the beams 10, which extend beneath the rear end portions of beams 7, 7, are connected the lower portions of the connecting splice plates 12, 12, the upper portions of which plates are bolted to the inner surfaces and rear end portions of beams 7, 7.

With the rear end portions of beams 10 are connected the respective ends of a transverse bar 13.

With the ends of the forward axle beam 8, are pivotally connected, in the customary manner, the forward beam-supporting and tractor-guiding wheels 14, 14.

15 indicates the motor, which as shown is an internal combustion engine, of sufficient power to draw heavy loads. This engine is mounted on the base 16, which base extends from the inner surface of one channel beam 7, to the inner surface of the other beam 7, the position of the engine being directly above the axle 8, and between said beams 7, 7. 17 indicates the driving shaft of the motor, and 18 the clutch on said shaft.

19 indicates the box or case inclosing the power transmission and speed-changing gear, for the purpose of the invention, the transmission gear only being shown, which box or case is rigidly connected with the inner surface of the beam 10, on the left-hand side of the frame, and with a support 19ˣ, on the right-hand side, and within which case the outer end portion of the motor shaft 17 extends.

Within the case 19, on shaft 17, is a speed gear 20. 21 indicates a separate shaft, journaled within the case 19, upon which is a gear wheel 22, in mesh with the gear wheel 20, the outer end portion of this shaft extends rearwardly from the case 19, a short distance, and is provided with a universal coupling or joint 23.

A short distance in rear of the case 19, and secured rigidly to the inner surfaces of the beams 10, 10, are the vertical plates or standards 24, 24. These plates extend upwardly a considerable height, and with the upper end portions of said plates are connected rigidly the respective ends of the plate 25, which forms the seat for the operator of the tractor.

The tractor or drive wheel 26, as shown, is large in circumference, and is arranged between the channel beams 10, 10', at the rear end of the frame of the tractor, and adjacent the channel beam 10' of the said frame. A stationary axle 27, extending transversely to and a considerable distance in height above the line of the upper surface of the beams 10, 10', forms the rear axle to the tractor, and upon the ends of which shaft which are directly above said channel beams are rigidly connected the collars 28, 28'. Upon shaft 27 is mounted the rotatable sleeve or hub 29, which extends about four-fifths the distance from the collar 28', on the end of shaft 27, above the channel beam 10', in the direction of the collar on the other end of said shaft above the beam 10.

Upon the sleeve or hub 29, a short distance inwardly from the end in contact with the fixed collar 28', is a concentric flange 30, having outwardly-bent annular portions 31. (See Fig. 5).

Upon said sleeve or hub 29, in the direction of its other end and a short distance inwardly therefrom, is a disk 32, integrally connected with said hub, a portion adjacent the hub being dished outwardly at 33.

In the wide rim or tire of the traction wheel, approximately one-fourth the distance inwardly from the outer edges of the rim are openings 34, reamed from the outer surface. These openings are spaced apart in the direction of the circumference of said rim, and within said opening are inserted the long bolts or spikes 35, the heads of which are seated in the reamed openings 34. These bolts extending from openings 34, spaced apart, cross each other, and one end of one of the crossed bolts extends through the outwardly-bent portion 31, on the flange 30, and is provided with a nut 36, and the end of the other bolt extends through the dished portion 33, of the disk 32, and is provided with a nut 37. The hub 29 is practically suspended by the bolts or spokes, a series of which extend from the tire to the flanges and disk, as seen in Fig. 5. The adjustment of the nuts 36 and 37 may be made without removing the hub from the wheel. A rotatable case 38 is positioned on the stationary shaft 27, to the left of the traction wheel, and whose circumference is slightly less than the rim of said traction wheel, and within which case, and protected from dust, and also within a body of oil supplied to said case, are located the traction wheel-propelling devices. This case 38 is composed of an outer, circular plate 39 (see Fig. 1), connected integrally with a short sleeve 40, the latter being mounted on the portion of the non-rotatable shaft 27, between the outer end of the hub 29 and the fixed collar 28. Upon the outer portion of the circular plate 39 is an inwardly-extended peripheral portion 41, a flange 42 being formed on said portion extending toward the hub 29 of the traction wheel.

A portion of the circular plate 39, forward of the hub 40, and extending from the peripheral portion 41, inwardly toward the hub, is extended or bent outwardly at 43, and likewise a portion 44 of the said peripheral portion 41, of said plate, to form the gear housing for the bull or bevel gear wheel 46, a portion of said circular plate 39 being also extended outwardly and forming the outer face of said housing, the annular portion 41 being increased in thickness to give strength to the housing. Through an opening 48, in said portion 41, extends a short rotary shaft 49, the forward end of which shaft is connected with the universal joint 23, on the engine shaft 17. The inner end of said shaft is journaled in the inner wall 50, of the housing for the bevel gear wheel 46, connected with the face portion 47, of said case, the bevel gear pinion 46 being mounted on said shaft 48, between said inner wall 50 and the outwardly-extended portion 44, of the annular portion 41, of plate 39.

The inner member of the case 38 consists of a circular plate 51, secured by the screw bolts 52, to the flange 42, on the peripheral portion 41, of the plate 39. This plate is dished inwardly at 51ˣ, in the direction of the traction wheel, and in said dished portion is a large, circular opening 53 (see Fig. 4), in the inner surface of which opening is a groove 54, and in said groove is a packing to retain the oil in the case 55. Within said opening 53 is fitted for rotation the disk 33, on the hub 29, of the traction wheel, the outer surfaces of the disk moving in frictional contact with the packing ring 55, in the opening 54, in the circular plate 51.

Within the casing 38 is a circular wheel plate 56, having a central opening 57 and dished in the direction of the circular plate 52. This plate 56 is secured to the rotary disk 32, by the bolts 58, which pass through the portions of plate 56 adjacent the opening 57, an annular shoulder 59 being cast on the inner surface of said disk 32, extending around the bolt opening. Upon the said bolts on the outer surface of the disk 32, are the securing nuts 60. Integrally connected with the outer portion of the wheel plate 56 is an annular flange 61, the rear surface of which bears against the inner surface and outer portions of plate 51, and upon the forward surface of said plate are the gear teeth 62, which mesh with the bevel gear wheel 46, in the housing on the plate 39.

Upon the left-hand side of the tractor frame, directly above the channel beam 43 is arranged, parallel with the power-transmitting shaft 49, a vibrating radius bar 64, the forward end of which bar is pivotally connected at 63, with the outer surface and forward portion of the standard 24, supporting the seat 25, in a transverse line with the pivot points of the universal joint 23. This bar extends rearwardly to a position immediately forward of the fixed collar 28, on the non-rotatable shaft 27, and is provided with ears 65, extending from the bar 63, in line with the upper and lower surfaces. Upon the side of the collar 28, toward said bar, are lugs 66, which extend between said ears 65. A bolt 67 extends upwardly through said ears and lugs and is provided with a head 67$^x$, which bears upon the lower surface of the flange 65. A bolt 69, having a head 68, extends upwardly through the lower and upper flanges of the channel beam 10, and is provided with a head 68', which head comes into contact with the aforesaid head 67$^x$, of bolt 67. Extending around the bolt 69 is a bushing 69$^x$, one end of which bears against the upper flange of the channel beam 10, and the other against the head 67$^x$, of the bolt 67, and serves as a check to the upward movement of the channel beams 10, 10'. Tap bolts 70 extend through the bar 64, into the face portion 47, of the housing for the bevel gear pinion 46, and the extended portion 44 of the outer, peripheral portion of the plate 39. On the inner surface of bar 64 is a lug 71, extending around the tap bolt. Upon the right-hand side of the tractor frame is a radius bar 64' which is precisely the same as the bar 64, and is pivotally connected with the standard 24, on said side of the tractor frame, and is connected in like manner as bar 64, with the fixed collar 28$^x$, on the shaft 27.

Upon the rear surfaces of the fixed collars 28, 28', on the non-rotatable shaft 27, are rigidly connected the separate lugs 72, one on each collar, through which extend the long bolts 73, the lower ends of which bolts are pivotally connected with the ears 74 on the inner surface of the channel beams 10, 10'. The upper end portions of these bolts extend upwardly a short distance above the upper lugs 72, on the collars 28, 28', and are screw-threaded. Around said portions of the bolts extend the helical springs 75, the lower ends of which springs bear upon the said upper lugs 72. On the bolts 73 are adjusting nuts 76, which bear upon the upper end portions of springs 75.

An ordinary canopy 77, secured to the forward channel beams 7, 7, of the frame of the tractor, incloses the engine, and a shield 78 extends from the rear portions of standards 24, over the traction wheel, to intercept the loose soil or dust carried by the said wheel.

79 indicates the steering column, and 80 the steering wheel. 81, 81 are the clutch-operating levers and 82 the gear shifting lever, all of which are operated in the well known manner in traction vehicles, and require no detailed description.

In the operation of the tractor, power from the engine 19 is transmitted through shaft 49 to the bevel gear pinion 46, within the casing 38, thence to the gear teeth 62, on the flanged wheel 56, and rotation is imparted to the disk 32, hub 29, on the rotating shaft 27, and to the traction wheel 26, a slow speed being accompanied with great traction power of the traction wheel on the ground.

In this movement, vibration which is transmitted in passing over rough or uneven ground from the traction wheel to the frame of the tractor, is arrested by the springs 75, on the bolts supporting said frame. The vibrating radius bar 64 preserves the alinement of the power-transmitting shafts, without being affected by the vibratory movements of the frame of the tractor, hence when the shocks occur, the springs 75 on the bolts 74, connected with the frame of the tractor, yield to absorb the shock to the frame.

The power transmitted to the pinion 46, from the transmission shaft, which would otherwise cause rotation of case 38, is prevented by its connecting device or tap screw 70 which screws the case rigidly to the radius or vibrating bar 64, at a point intermediate the ends of said bar the retention of the casing 38 forcing the traction wheel to rotate and transmits the driving strain from the casing and universal joint to the radius bar.

The power applied to the pinion 64 to operate the traction wheel with the case 38, held as before described, is transmitted from the case to the radius arm or bar 64, which in turn is transmitted to the portion 10, of the frame. In order to prevent the frame from upward movement from the result of the force, the sleeve 69× between the bar 64 and the said portion 10 of the frame, checks the upward movement of the said portion of the frame.

It is obvious that housing for the pinions in motor vehicles may be carried by the radius arm 64, with the advantages heretofore described and upon tractors not employing the casing 38. Furthermore, all of the advantages of a brace bar for the alinement of the axle is obtained by the radius bar, as well as an oscillating movement of the casing for the pinion and pinion shaft, to take the shock on the axle from unevenness of the ground. In the construction of the framing of the tractor in separate parts, the rear portion is brought nearer the ground and upon a lower plane than the forward portion, hence the advantage in plowing is readily seen in that the drag bar 13 affords deep plowing and convenient attachment for the plow or other implement.

Such modifications of the invention may be employed as are within the scope of the appended claims.

Having fully described my invention, what I now claim as new and desire to secure by Letters Patent is:

1. In a motor vehicle, the combination with a spring-supported frame, a motor and its driving shaft, and an axle, and driving wheel, of a pinion, and a rotary pinion shaft, and a housing supporting the rotary pinion shaft, gearing on the driving wheel actuated by the pinion, a universal joint between the pinion and motor shafts, a radius bar connected with the axle, and a pivotal support therefor on the frame of the vehicle, and a fixed support for the housing for the pinion on the radius bar.

2. In a motor vehicle, the combination with a spring-supported frame and axle and the driving wheel, a motor and a motor shaft, a pinion and a pinion shaft, means for transmitting motion from the pinion to the driving wheel, a universal joint connecting the shafts of said motor with the said pinion, a housing for supporting said pinion shaft in rotation, and a radius bar connected with the axle of the driving wheel, and a pivotal support therefor on said frame in alinement with the universal joint, and a fixed support for the housing for said pinion on the radus bar.

3. In a tractor, the combination with the frame of the machine, and axle, and springs supporting said frame on said axle, a traction wheel, a motor on said frame, and a motor shaft, a pinion, and a rotary pinion shaft, a casing for supporting said pinion and rotary pinion shaft, a universal joint connecting the pinion, and motor shafts with each other, gearing for actuating the tractor wheel meshing with said pinion, and a radius bar pivotally connected to the axle for the traction wheel, and a pivotal support therefor on the frame of the tractor in alinement with the universal joint, and also fixedly connected intermediate its ends with the casing for said pinion.

4. In combination with the frame of a motor vehicle and its axle and driving wheel, of a rotary pinion shaft and pinion, and a housing in which said pinion shaft is journaled, of a motor and motor shaft, and a flexible joint connecting said motor shafts with the rotary pinion shaft, and a radius bar extending from said axle and parallel with the rotary shaft for said pinion, and a support on said frame with which said radius bar is pivotally connected, and connecting means on the radius bar intermediate its ends for supporting fixedly the housing from non-rotation with the pinion.

5. In a tractor, the combination with the frame of the machine and axle, and a divided sleeve on said axle, and springs supporting said frame on said axle, a traction wheel mounted on one portion of the divided sleeve, and gearing actuating the traction wheel on the other portion of said divided sleeve, a casing supporting the gearing on the portion of the divided sleeve carrying said traction wheel, a motor on said frame, and a motor shaft, and a rotary pinion shaft and pinion actuating the gearing for the traction wheel, a housing within which the pinion shaft and pinion is journaled, cared by the gear casing, a universal joint connecting the motor shaft with the shaft to said pinion, and a radius bar pivotally connected with the axle for said traction wheel, and a support on said frame in alinement transverse to said frame with said universal joint and with which the said radius bar is also pivotally connected, and connecting means on said radius bar intermediate its ends connected with the housing for the retention of said housing and said casing.

6. In a tractor, the combination with the frame of the machine and its side beams, and the traction wheel, and the axle for said wheel arranged above said frame, and with springs supporting said frame, of lugs on the ends of said axle, and bolts extending through said lugs, radius bars having ears at their rear ends and supported by said bolts on said lugs, means for pivotally supporting the forward end of the radius bars on the side beams of said frame, and heads on said bolts, and separate bolts extending through the side beams and having their heads contacting with the heads of the bolts on said lugs, and bushings upon said bolts on said side beams between said beams and the heads of the bolts on said side beams.

NORMAN H. SOOY.

Witnesses:
ANNIE L. GREER,
ROBERT O. McLIN.

Copies of this patent may be obtained for five cents each, by addressing the "Commissioner of Patents, Washington, D. C."